: US 6,865,340 B1
(45) Date of Patent: Mar. 8, 2005

(54) CD-TYPE DISC IN WHICH A DVD APPLICATION IS RECORDED ON A PHYSICAL LAYER OF THE CD-TYPE DISC, AND A RECORDING/REPRODUCING APPARATUS AND METHOD THEREOF

(75) Inventors: Jung-kwon Heo, Seoul (KR); Young-nam Oh, Seongnam (KR); Hyun-kwon Chung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/534,494

(22) Filed: Mar. 24, 2000

(30) Foreign Application Priority Data

Mar. 25, 1999 (KR) .............................. 99-10271

(51) Int. Cl.⁷ .............................. H04N 5/85; H04N 7/04
(52) U.S. Cl. ..................... 386/125; 386/105; 386/106
(58) Field of Search ................................ 386/125, 126, 386/124, 123, 109, 111, 112, 105, 106, 104, 46, 45, 40, 39, 37, 27, 33, 1; H04N 5/85, 7/04

(56) References Cited

U.S. PATENT DOCUMENTS 5,734,787 A * 3/1998 Yonemitsu et al. ......... 386/111
5,959,280 A * 9/1999 Kamatani .................. 369/52.1

FOREIGN PATENT DOCUMENTS

| EP | 0 817 181 A2 | 1/1998 |
|---|---|---|
| EP | 0 817 195 A2 | 1/1998 |
| JP | 8-63901 | 3/1996 |
| JP | 8-180417 | 7/1996 |
| JP | 8-203210 | 8/1996 |
| JP | 8-227528 | 9/1996 |
| JP | 10-21673 | 1/1998 |
| JP | 10-172182 | 6/1998 |
| JP | 11-25607 | 1/1999 |
| JP | 11-53840 | 2/1999 |
| JP | 11-162114 | 6/1999 |
| KR | 98-082247 | 12/1998 |
| WO | WO 98/38637 | 9/1998 |

OTHER PUBLICATIONS

"Universal Disk Format Specification—Revision 1.50", Jan. 4, 1997, Optical Storage Technology Association XP002147696, pp. 100–108.
Micrographics & Optical Technology, vol. 15, No. 4, 1997, pp. 7–8.
"Packet Writing and UDF: CD Recording's Logical Next Step", EMEDIA Professionnal, May 1997, pp. 30–38.

* cited by examiner

Primary Examiner—Robert Chevalier
(74) Attorney, Agent, or Firm—Stein, McEwen & Bui, LLP

(57) ABSTRACT

A disc in which a digital versatile disc (DVD) application is recorded in a physical layer of the disc, a recording/reproducing apparatus, and a recording/reproducing method are provided. In the disc, a lead-in area, a lead-out area and a user area, each having a compact disc read only memory (CD-ROM) format, are distinguished on the physical layer of the disc and a digital versatile disc (DVD) application, according to a predetermined file system, is recorded in the user area. Therefore, a low-priced disc can be used for a music video or a presentation which requires only a short-time to reproduce since the DVD application can be recorded on and reproduced from the disc to obtain multiple functions having high image quality and high sound quality.

14 Claims, 5 Drawing Sheets

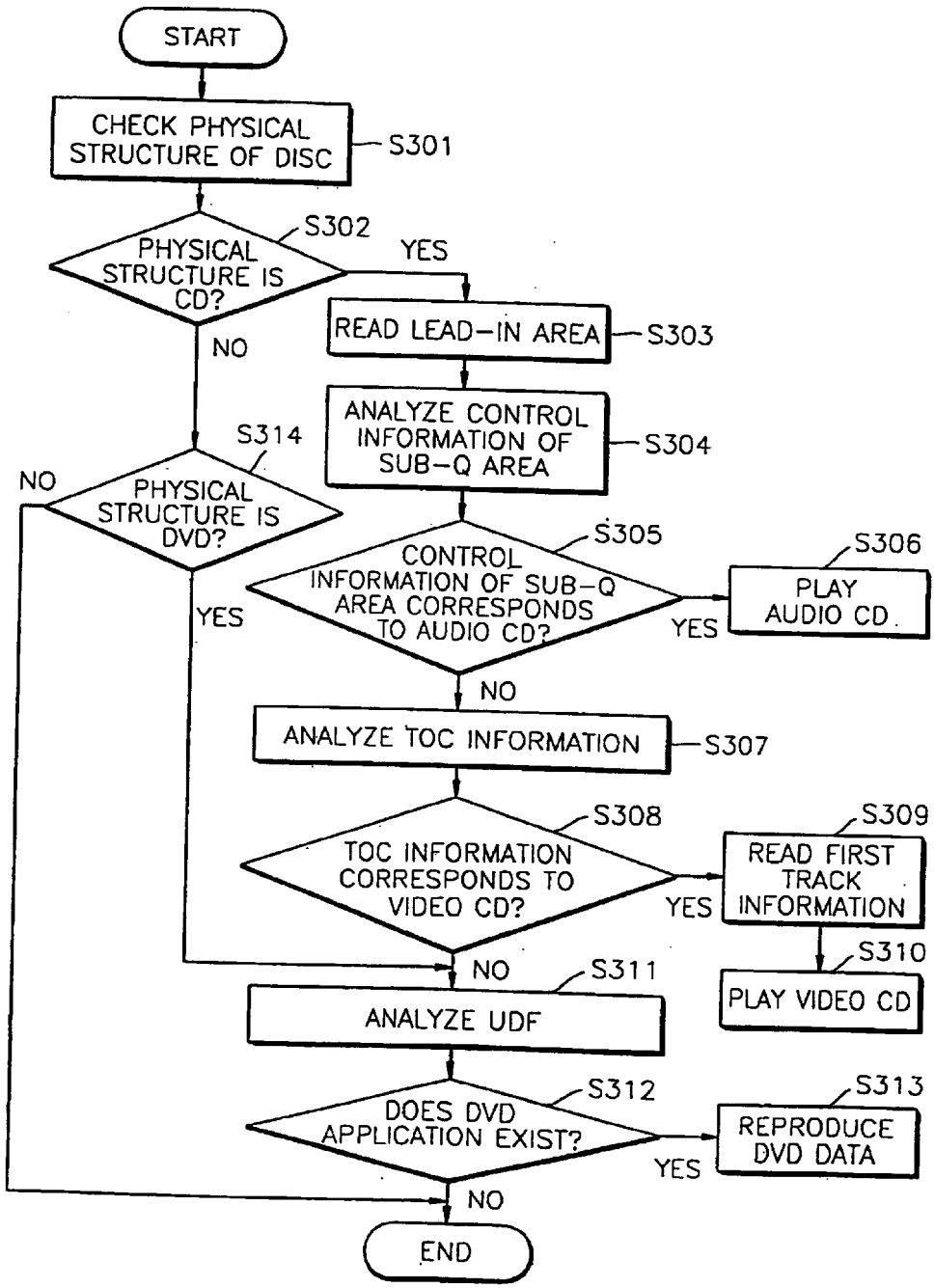

CD-TYPE DISC IN WHICH A DVD APPLICATION IS RECORDED ON A PHYSICAL LAYER OF THE CD-TYPE DISC, AND A RECORDING/REPRODUCING APPARATUS AND METHOD THEREOF

CROSS-REFERENCE TO RELATED APPLICATIONS

This application claims the benefit of Korean Application No. 99-10271, filed Mar. 25, 1999, in the Korean Patent Office, the disclosure of which is incorporated herein by reference.

BACKGROUND OF THE INVENTION

1. Field of the Invention

The present invention relates to the field of optical recording media and more particularly, to a disc in which a digital versatile disc (DVD) application is recorded on a physical layer of a compact disc (CD) and a recording/reproducing apparatus and method thereof.

2. Description of the Related Art

A DVD video format is used to record and reproduce high image quality video data and/or high sound quality audio data having a transmission rate of about 10 Mbps (mega bits per second). However, a DVD is generally used by people who do large-scale marketing, such as film producers, since it is very expensive to manufacture DVDs.

At present, popular CDs have become much cheaper and even common users can directly manufacture CDs with the spread of the CD-R (Recordable). Also, 32x-speed CD drives are now on the market due to the development of new techniques for CD drives.

Given that the transmission rate of CDs is about 1.5 Mbps, 8x-speed or greater CD drives have a 10 Mbps or faster transmission rate. Therefore, data recording and reproduction at the same rate as the transmission rate of DVDs is possible. However, the recording time of CDs is much shorter than that of DVDs. Therefore, CDs cannot record data for a long period of time. However, CDs can be used when high image quality reproduction is required for a short time for applications such as clips for presentations or promotions.

However, since existing CD recorders cannot record this high image quality DVD data, new recorders are required. Even if DVD data can be recorded on a CD, existing CD/DVD players will recognize a disc on which DVD data is recorded as a CD and play the disc using a playing process for CDs. Thus, reproduction of the DVD data recorded on the CD is not possible since the disc is a CD in terms of its physical properties but is a DVD in terms of its logical structure.

In FIG. 1, which is a flowchart for illustrating a reproducing method performed by a conventional CD player, a focusing servo is controlled so that the information on the disc loaded into the CD player is properly picked up and, thus, the information in a lead-in area of the disc is read in step S101.

General CDs include audio CDs, video CDs, and CD-ROMs. A CD-ROM is a disc (q; having a logical format which is used for data recording with a computer in contrast to an audio CD or a video CD. These CDs are differentiated by the control information in a sub-Q area of the lead-in area and Stable of contents (TOC) information. If an audio CD is prescribed in the control information in the sub-Q area, the CD is immediately recognized as an audio CD. If general data other than the audio CD is prescribed in the control information on the sub-Q area, the CD is recognized as a video CD or a CD-ROM.

That is, the control information of the sub-Q area in the lead-in area is analyzed in step S102. A determination as to whether an audio CD is prescribed in the control information of the sub-Q area is made using the above analysis in step S103. If it is determined in step S103 that an audio CD is prescribed in the control information of the sub-Q area, audio data is reproduced by an audio CD playing process in step S104. If it is determined in step S103 that an audio CD is not prescribed in the control information of the sub-Q area, TOC information is analyzed in step S105.

Then, it is determined whether a video CD is prescribed in the analyzed TOC information in step S106. If it is determined in step S106 that a video CD is prescribed in the analyzed TOC information, the video CD information recorded on the first track of the disc is read in step S107 and, then, video data is reproduced by a video CD playing process according to the read first track information in step S108. If it is determined in step S106 that a video CD is not prescribed in the analyzed TOC information, the disc is recognized as a CD-ROM and, then, the fact that it is impossible for the CD player to play the loaded disc is displayed in step S109. Then, the playing process is ended.

In existing CD players for recognizing and playing only audio CDs and video CDs, and in existing CD/DVD players for recognizing and playing audio CDs, video CDs, and DVDs, a disc proposed by the present invention, on which DVD format data is recorded on a physical layer of a CD-type disc, is recognized as a CD and a general CD reproducing process is performed. Therefore, reproduction of the DVD format data is not possible.

SUMMARY OF THE INVENTION

To solve the above problem, an object of the present invention is to provide a disc in which information is recorded in a CD-ROM format in lead-in and lead-out areas on a physical layer of a CD-type disc and information is recorded on a user area in the logical format of a DVD.

Another object of the present invention is to provide a disc recording apparatus for recording DVD information on a physical layer of a CD-type disc.

Still another object of the present invention is to provide a disc reproducing apparatus for reproducing a disc in which DVD information is recorded on a physical layer of a CD-type disc.

Yet another object of the present invention is to provided a disc recording method of recording DVD information on a physical layer of a CD-type disc.

Still yet another object of the present invention is to provided a disc reproducing method of reproducing a disc in which DVD information is recorded on a physical layer of a CD-type disc.

Additional objects and advantages of the invention will be set forth in part in the description which follows and, in part, will be obvious from the description or may be learned by practice of the invention.

To achieve the first object and other objects, there is provided a disc according to the present invention wherein a lead-in area, a lead-out area, and a user area, each having a compact disc read only memory (CD-ROM) format, are distinguished on a physical layer of a CD-type disc and information having a digital versatile disc (DVD) application format, according to a predetermined file system, is recorded in the user area.

To achieve the second and third objects and other objects, the present invention provides an apparatus for recording/reproducing data on/from a physical layer of a CD-type disc which is divided into a lead-in area, a lead-out area, and a user area each having a CD-ROM format. The recording apparatus includes: a DVD application A/V encoder which encodes received audio and/or video (A/V) signals in a DVD format to provide an A/V stream; a first formatter which formats the A/V stream in a predetermined file system for a DVD application; and a second formatter which writes data formatted in the predetermined file system to the user area, formats data for the lead-in area and the lead-out area in a CD-ROM format, and writes CD-ROM formatted data to the lead-in area and the lead-out area.

The reproducing apparatus according to the present invention includes: a differentiator which determines whether a disc loaded into a drive is a CD, and if it is determined that the disc is a CD, determines whether the CD is a video CD or an audio CD; an analyzer which analyzes whether a predetermined file system exists if it is determined by the differentiator that the disc is neither a video CD nor an audio CD; a deformatter which deformats a DVD application which has been written to the user area when the predetermined file system exists, and provides deformatted data; and a decoder which decodes the deformatted data to restore the original A/V signal.

To achieve the fourth and fifth objects and other objects, the present invention provides a method for recording/reproducing data on/from a physical layer of a CD-type disc which is divided into a lead-in area, a lead-out area, and a user area each having a CD-ROM format. The recording method according to the present invention includes: encoding received audio and/or video (A/V) signals into a DVD format to provide an A/V stream; formatting the A/V stream according to a predetermined file system for a DVD application; and writing data formatted in the predetermined file system to the user area, formatting data for the lead-in area and the lead-out area in a CD-ROM format, and writing CD-ROM formatted data to the lead-in area and the lead-out area.

The reproducing method according to the present invention includes: determining whether a disc loaded into a drive is a CD, and if it is determined that the disc is a CD, by determining whether the CD is a video CD or an audio CD; determining whether a predetermined file system exists if it is determined that the CD is neither a video CD nor an audio CD; deformatting a DVD application written to the user area when the predetermined file system exists and providing deformatted data; and decoding the deformatted data to restore the original A/V signal.

BRIEF DESCRIPTION OF THE DRAWINGS

The above objects and advantages of the present invention will become more apparent by describing in detail preferred embodiments thereof with reference to the attached drawings in which:

FIG. 7 is a flowchart illustrating another embodiment of a reproducing method according to the present invention.

DESCRIPTION OF THE PREFERRED EMBODIMENTS

Figure 1:
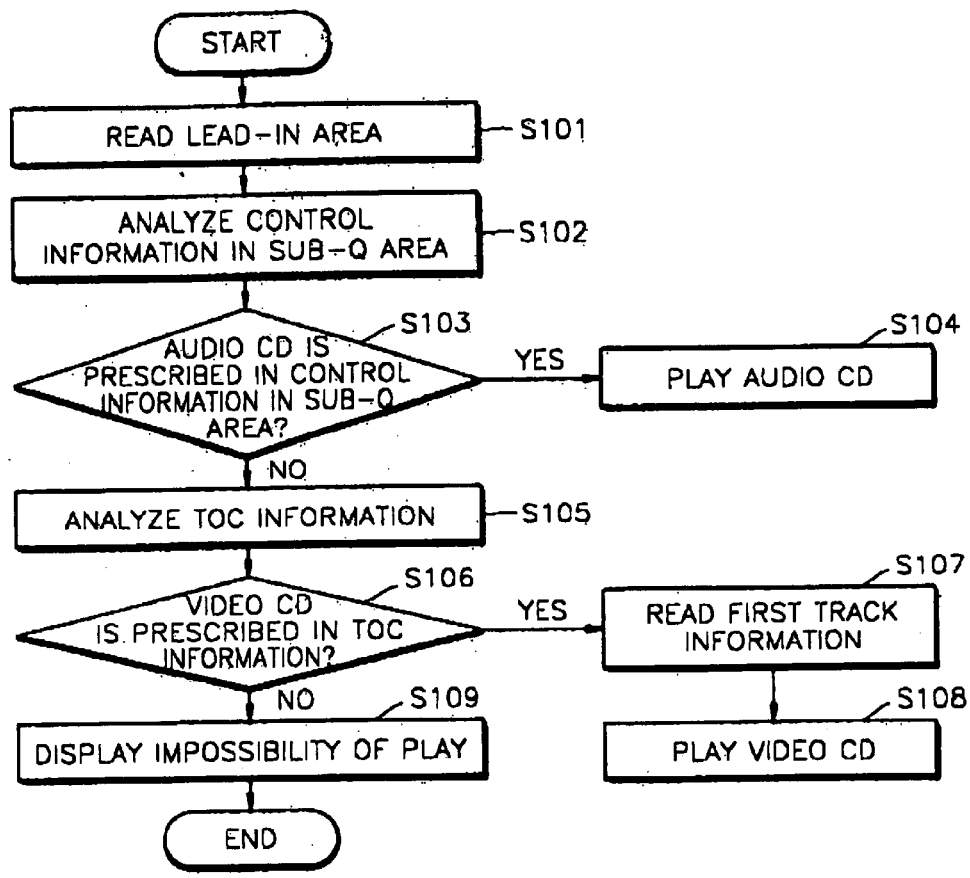
FIG. 1 is a flowchart illustrating a reproducing method performed by a conventional CD player.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
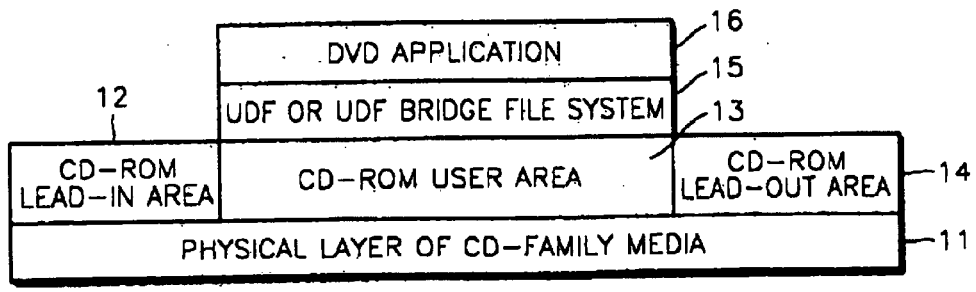
FIG. 2 is a view illustrating an example of the structure of a disc according to the present invention.

The structure of a disc according to the present invention is shown in FIG. 2 and a CD, a CD-R (Recordable) or a CD-RW (Rewritable) is used as the disc medium. In FIG. 2, a CD-ROM format is used on a physical layer of a CD-type disc 11. That is, the CD-ROM format is divided into a lead-in area 12, a user area 13, and a lead-out area 14. Thus, both the control information and TOC information in the lead-in area 12 use the same format as a general CD-ROM format. That is, the format used on the physical layer of a CD-type disc 11 is a CD-ROM format which is different from the format of an audio CD or a video CD.

The logical format of the user area 13, according to the present invention, follows a DVD format. The DVD format is based on a file system which is called a universal disk format (UDF). The specifications of a file system 15 and a DVD application 16 which is based on the file system have already been defined by the DVD forum.

In the disc of the present invention, as shown in FIG. 2, the lead-in area 12, the user area 13 and the lead-out area 14 on the physical layer of a CD-type disc 11 are distinguished on the basis of the format of a CD-ROM. Information corresponding to the CD-ROM format is recorded in the lead-in area 412 and the lead-out area 14. The logical volume area of the user area 13 records the DVD application 16 based on the file system 15, such as a UDF file system or a UDF bridge format. Here, the UDF bridge format is a format where a UDF and an international standard organization (ISO) 9660 format, which is used in general CD-ROMs, coexist. A CD-ROM drive installed in a computer requires the ISO 9660 format to read a disc and, therefore, the UDF bridge format is used. However, the file system format can include only the UDF if the formats for the file system are all changed into the UDF after a certain lapse of time.

Figure 3:
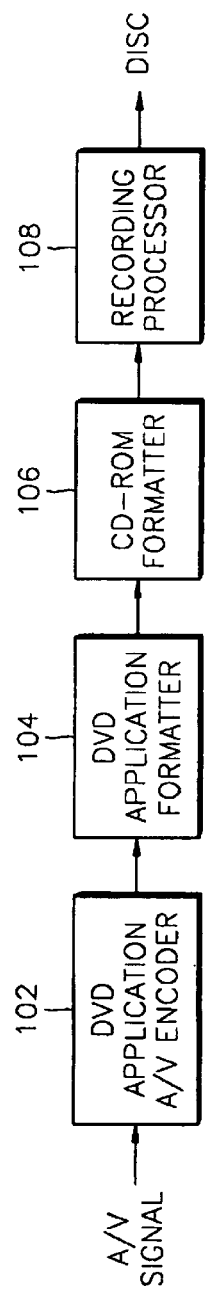
FIG. 3 is a block diagram illustrating an embodiment of a recording apparatus according to the present invention.

FIG. 3 is a block diagram illustrating an embodiment of a disc recording apparatus according to the present invention, including a DVD application A/V encoder 102, a DVD application formatter 104, a CD-ROM formatter 106 and a recording processor 108.

The DVD application A/V encoder 102 encodes received audio and/or video (A/V) signals in accordance with a DVD application. If a video signal is received, it is coded using a specification which is defined in a DVD video application book and a coded video stream is provided. If an audio signal is received, it is encoded using a specification which is defined in a DVD audio application book and an encoded audio stream is provided. The DVD application formatter 104 formats the encoded audio and video streams received from the DVD application A/V encoder 102 and the information associated with the corresponding streams using a file system of a UDF or a UDF bridge format and provides DVD application formatted data.

The CD-ROM formatter 106 writes the DVD application formatted data received from the DVD application formatter 104 to the user area distinguished on the basis of the CD-ROM format and writes lead-in data and lead-out data, which are defined in the CD-ROM format, to the lead-in area and the lead-out area distinguished on the basis of the CD-ROM format. The recording processor 108 digitally signal-processes data received from the CD-ROM formatter 106 and records the resultant data on a physical layer of a CD-type disc.

Figure 4:
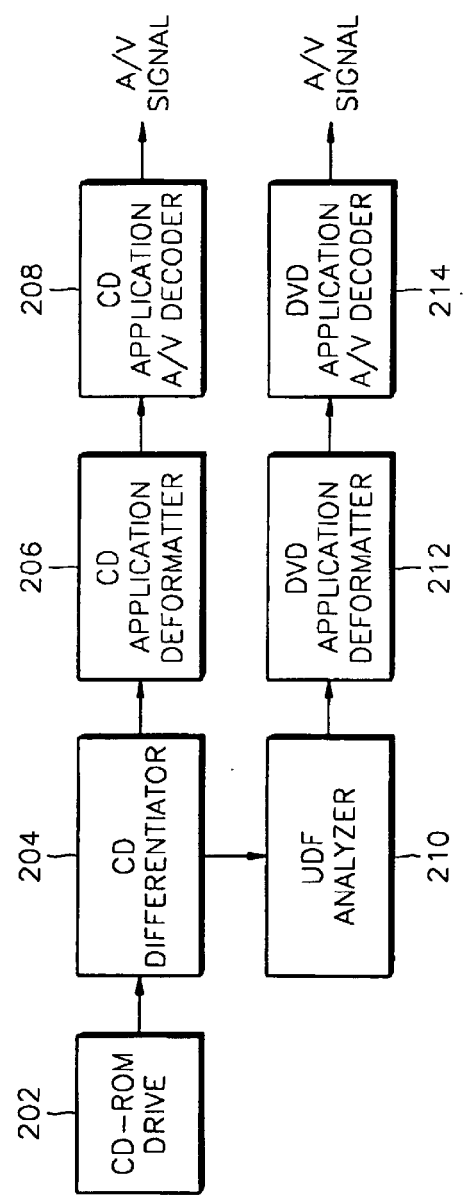
FIG. 4 is a block diagram illustrating an embodiment of a reproducing apparatus according to the present invention.

FIG. 4 is a block diagram illustrating an embodiment of a reproducing apparatus according to the present invention. The reproducing apparatus includes a CD-ROM drive 202, a CD differentiator 204, a CD application deformatter 206, a CD application A/V decoder 208, a UDF analyzer 210, a DVD application deformatter 212, and a DVD application A/V decoder 214.

When a disc is loaded into the CD-ROM drive 202, which supports an 8x-speed or aster transmission rate and can access an audio CD, a video CD and a CD on which DVD format data is recorded, the CD differentiator 204 determines whether the loaded disc is a general audio CD or a general video CD. That is, the CD differentiator 204 determines whether the disc loaded into the CD-ROM drive 202 is an audio CD using the control information in a sub-Q area of the lead-in area on the disc. If it is determined that the disc is it an audio CD, the CD differentiator 204 provides a differentiation signal to the CD application deformatter 206. If it is determined that the disc is not an audio CD, the CD differentiator 204 analyzes TOC information to determine whether the disc is a video CD. If it is determined that the disc is a video CD, the CD differentiator 204 provides a differentiation signal to the CD application deformatter 206. On the other hand, if it is determined that the disc is neither an audio CD nor a video CD, the CD differentiator 204 provides a differentiation signal representing the result of the determination to the UDF analyzer 210. The CD application deformatter 206 deformats data which has been read from the disc according to the differentiation signal in accordance with an audio CD application or a video CD application. The CD application A/V decoder 208 decodes CD application deformatted data to output the original A/V signal.

The UDF analyzer 210 determines whether the loaded disc has a UDF file system if the differentiation signal from the CD differentiator 204 represents that the loaded disc is neither an audio CD nor a video CD. If it is determined that the disc has a UDF file system and that the file system is used for a DVD application, the DVD application deformatter 212 deformats data read from the disc in accordance with the DVD application. The DVD application A/V decoder 214 decodes DVD application deformatted data to reproduce the original A/V signal.

The reproducing apparatus shown in FIG. 4 plays general CDs (e.g., an audio CD and a video CD) and a disc proposed by the present invention on which a DVD application is recorded on a physical layer of a CD-type disc. However, the present invention is also applicable to an apparatus for playing only discs on which a DVD application is recorded on a physical layer of a CD-type disc, without playing general CDs. This apparatus includes the. CD-ROM drive 202, the CD differentiator 204, the UDF analyzer 210, the DVD application deformatter 212 and the DVD application A/V decoder 214.

Figure 5:
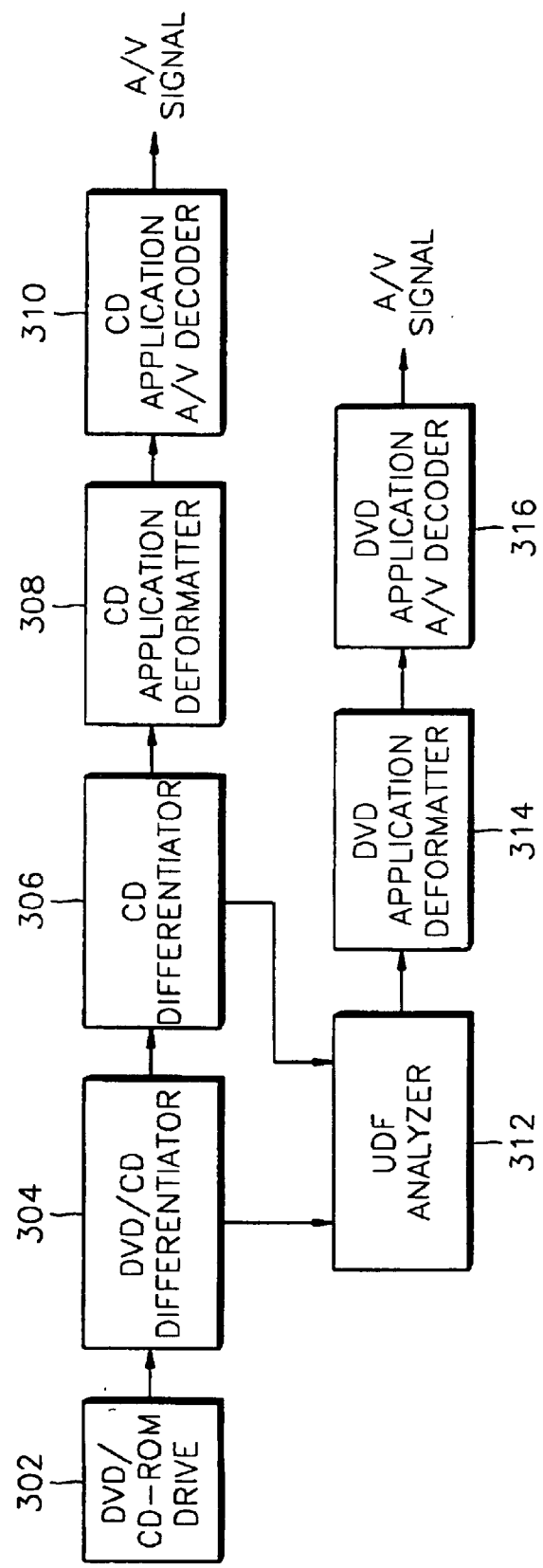
FIG. 5 is a block diagram illustrating another embodiment of a reproducing apparatus according to the present invention.

FIG. 5 is a block diagram illustrating another embodiment of a disc reproducing apparatus according to the present invention. The disc reproducing apparatus includes a DVD/CD-ROM drive 302, a DVD/CD differentiator 304, a CD differentiator 306, a CD application deformatter 308, a CD application A/V decoder 310, a UDF analyzer 312, a DVD led application deformatter 314 and a DVD application A/V decoder 316 and can play both a general DVD and a disc proposed by the present invention in which a DVD application is recorded on a physical layer of a CD-type disc.

The DVD/CD-ROM drive 302 can access a CD or DVD on which DVD formatted data is recorded, and particularly, has an 8x-speed or greater transmission rate when the loaded disc is a CD. The DVD/CD differentiator 304 determines the physical structure of a loaded ax disc. If the loaded disc has a physical structure corresponding to a CD, the DVD/CD differentiator 304 provides a differentiation signal representing that the physical structure of the disc corresponds to that of a CD to the CD differentiator 306. However, if the loaded disc has a physical structure corresponding to that of a DVD, the DVD/CD differentiator 304 provides a differentiation signal representing that the physical structure of the disc corresponds to that of a DVD to the UDF analyzer 312.

The CD differentiator 306 determines that the CD is an audio CD or a video CD if the differentiation signal provided by the DVD/CD differentiator 304 represents that the physical structure of the loaded disc corresponds to that of a CD. If the CD is an audio CD or a video CD, the CD differentiator 306 provides a differentiation signal representing that the CD is an audio CD or video CD to the CD application deformatter 308. If the CD is neither an audio CD nor a video CD, the CD differentiator 306 provides a differentiation signal representing the result of the determination to the UDF analyzer 312.

The structures and operations of the CD application deformatter 308, the CD application A/V decoder 310, the UDF analyzer 312, the DVD application deformatter 314 and the DVD application A/V decoder 316 are the same as those shown in FIG. 4 so they will not be described again.

Figure 6:
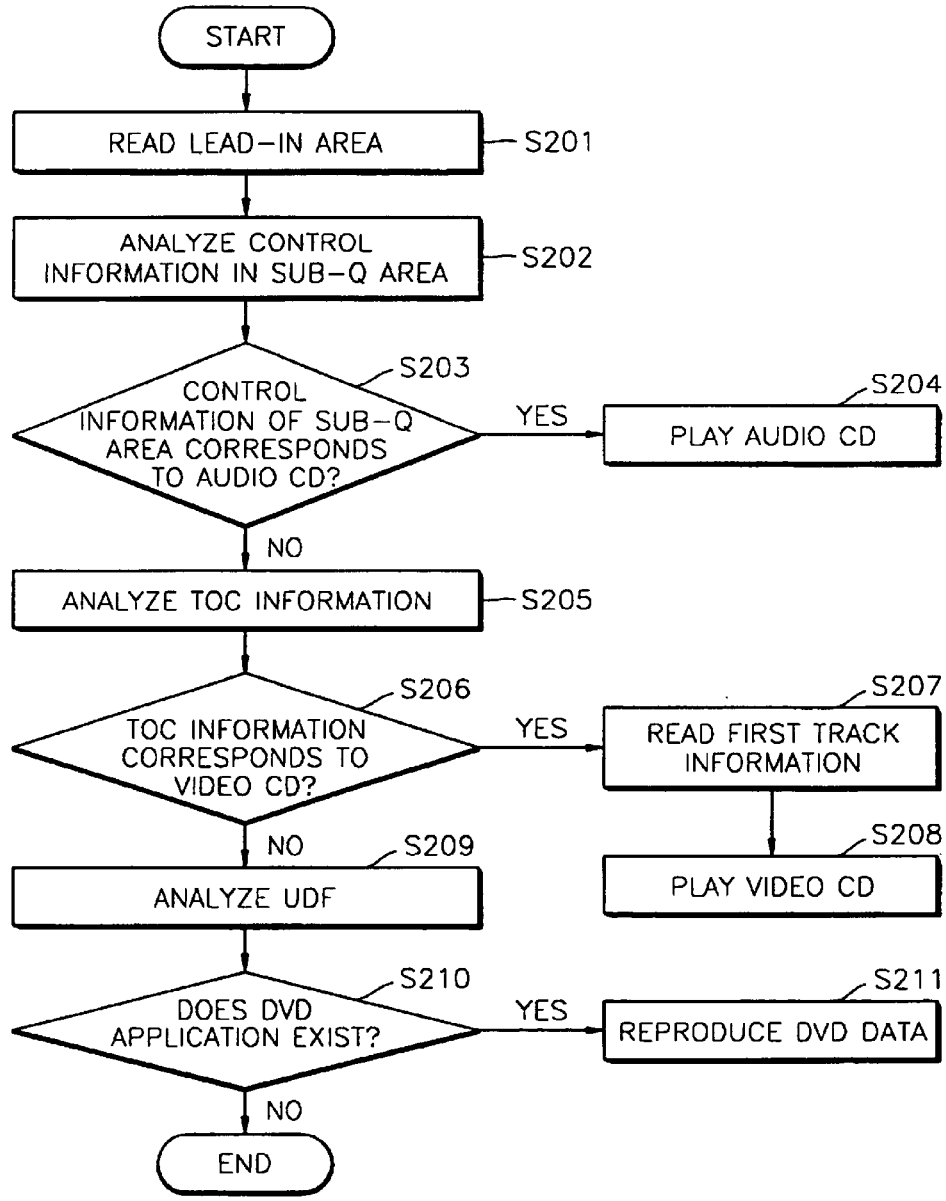
FIG. 6 is a flowchart illustrating an embodiment of a reproducing method according to the present invention.

FIG. 6, which is a flowchart illustrating an embodiment of a disc reproducing method according to the present invention, will now be described with reference to the disc reproducing apparatus shown in FIG. 4. First, the information in the lead-in area of a disc loaded into the CD-ROM drive 202 is read in step S201. Then, the control information in the sub-Q area of the lead-in area is analyzed in step S202. If it is determined in step S203 that the control information in the sub-Q area corresponds to an audio CD, the audio CD is played in step S204. If it is determined in step S203 that the control information in the sub-Q area does not correspond to an audio CD, TOC information is analyzed in step S205.

If it is determined in step S206 that the analyzed TOC information corresponds to a video CD, video CD information is read from a first track in step S207. Then, the video CD is played according to the read first track information in step S208.

If it is determined in step S206 that the analyzed TOC information does not correspond to a video CD, a UDF is analyzed in step S209 and, then, the existence or non-existence of a DVD application is determined in step S210. If it is determined in step S210 that a DVD application exists, DVD data is reproduced in step S211. Otherwise, the disc reproducing process is concluded.

FIG. 7, which is a flowchart illustrating another embodiment of a disc reproducing method according to the present invention, will now be described with reference to the reproducing apparatus shown in FIG. 5. In FIG. 7, the physical structure of a disc loaded into the DVD/CD-ROM drive 302 is checked in step S301. If it is determined in step S302 that the physical structure thereof corresponds to that of a CD, the information in the lead-area of a disc is read in step S303. Steps S303 through S313 are the same as steps S201 through S211 shown in FIG. 6 so they will not be described again.

On the other hand, if it is determined in step S302 that the physical structure of the loaded disc does not correspond to that of a CD, a determination is made in step S314 as to whether the physical structure thereof corresponds to that of a DVD. If it is determined in step S314 that the loaded disc is a DVD, a UDF is analyzed in step S311. Otherwise, the process is concluded.

As described above, the recording apparatus according to the present invention can record a DVD application on a physical layer of a CD-type disc and a disc in which a DVD application is recorded on a physical layer of the CD-type disc can be reproduced by the reproducing apparatus of the present invention. Also, the present invention can be used for music videos or presentations which require reproduction for a short period of time using a low-priced CD-type disc since DVD applications can be recorded on and reproduced from the CD-type disc to obtain a high image quality and a high sound quality, which are possible in DVD applications.

What is claimed is:

1. An apparatus to record/reproduce data on/from a physical layer of a CD-type disc which is divided into a lead-in area, a lead-out area and a user area, each having a CD-ROM format, comprising:

a DVD application audio/video (A/V) encoder to encode a received A/V signal into a DVD format to provide an A/V stream;

a first formatter to format the A/V stream according to a predetermined file system for a DVD application;

a second formatter to write data formatted according to the predetermined file system to the user area, to format data for the lead-in area and the lead-out area in the CD-ROM format and to write the CD-ROM formatted data to the lead-in area and the lead-out area;

a differentiator to determine whether the disc is a CD and if it is determined that the disc is a CD, to determine whether the CD is a video CD or an audio CD;

an analyzer to analyze whether the predetermined file system exists if it is determined by said differentiator that the disc is neither a video CD nor an audio CD;

a first deformatter to deformat the DVD application which has been written to the user area when the predetermined file system exists, to provide first deformatted data; and a first decoder to decode the first deformatted data to restore the A/V signal.

2. The apparatus of claim 1, further comprising:

a second deformatter to deformat a CD application which has been read from the disc if it is determined by said differentiator that the disc is a video CD or an audio CD, to provide second deformatted data; and a second decoder to decode the second deformatted data to restore the A/V signal.

3. An apparatus to record/reproduce data on/from a physical layer of a CD-type disc which is divided into a lead-in area, a lead-out area and a user area, each having a CD-ROM format, comprising:

a DVD application audio/video (A/V) encoder to encode a received A/V signal into a DVD format to provide an A/V stream;

a first formatter to format the A/V stream according to a predetermined file system for a DVD application;

a second formatter to write data formatted according to the predetermined file system to the user area, to format data for the lead-in area and the lead-out area in the CD-ROM format and to write the CD-ROM formatted data to the lead-in area and the lead-out area;

a first differentiator to determine whether the disc is a DVD or a CD by checking the physical structure of the disc;

a second differentiator to determine whether the disc is a video CD or an audio CD if it is determined by said first differentiator that the disc is a CD;

an analyzer to analyze whether the predetermined file system exists if it is determined by said second differentiator that the disc is neither a video CD nor an audio CD or if it is determined by said first differentiator that the disc is a DVD;

a first deformatter to deformat the DVD application which has been read from the disc if the predetermined file system exists, to provide first deformatted data;

a first decoder to decode the first deformatted data to restore the A/V signal;

a second deformatter to deformat a CD application which has been read from the disc if it is determined by said second differentiator that the disc is a video CD or an audio CD, to provide second deformatted data; and a second decoder to decode the second deformatted data to restore the A/V signal.

4. A method of recording/reproducing data on/from a physical layer of a CD-type disc which is divided into a lead-in area, a lead-out area and a user area, each having a CD-ROM format, comprising:

(a) encoding received audio and/or video (A/V) signals into a DVD format to provide an A/V stream;

(b) formatting the A/V stream according to a predetermined file system for a DVD application;

(c) writing the A/V stream formatted according to the predetermined file system to the user area, formatting data for the lead-in area and the lead-out area in the CD-ROM format, and writing the CD-ROM formatted data to the lead-in area and the lead-out area;

(d) determining whether the disc is a CD and if it is determined that the disc is a CD, determining whether the CD is a video CD or an audio CD;

(e) determining whether the predetermined file system exists if it is determined in said step (d) that the disc is neither a video CD nor an audio CD;

(f) deformatting the DVD application written to the user area when the predetermined file system exists, to provide first deformatted data; and (g) decoding the first deformatted data to restore the A/V signals.

5. The method of claim 4, further comprising:

(h) deformatting a CD application which has been read from the disc if it is determined in said step (d) that the disc is a video CD or an audio CD, to provide second deformatted data; and (i) decoding the second deformatted data to restore the A/V signals.

6. A method of recording/reproducing data on/from a physical layer of a CD-type disc which is divided into a lead-in area, a lead-out area and a user area, each having a CD-ROM format, comprising:

(a) encoding received audio and/or video (A/V) signals into a DVD format to provide an A/V stream;

(b) formatting the A/V stream according to a predetermined file system for a DVD application;

(c) writing the A/V stream formatted according to the predetermined file system to the user area, formatting data for the lead-in area and the lead-out area in the CD-ROM format, and writing the CD-ROM formatted data to the lead-in area and the lead-out area (d) discriminating whether the disc is a DVD or a CD by checking the physical structure of the disc;

(e) determining the CD type if it is determined in said step (d) that the physical structure of the disc corresponds, to that of a CD;

(f) determining whether the predetermined file system exists if it is determined in said step (d) that the physical structure of the disc corresponds to that of a DVD or if it is determined in said step (e) that the disc is neither a video CD nor an audio CD;

(g) deformatting the DVD application read from the disc when the predetermined file system exists, to provide first deformatted data; and (h) decoding the first deformatted data to restore the A/V signals.

7. The method of claim 6, further comprising:

(i) deformatting a CD application which has been read from the disc if it is determined in said step (e) that the CD is a video CD or an audio CD, to provide second deformatted data; and (j) decoding the second deformatted data to restore the A/V signals.

8. An apparatus to reproduce information from a physical layer of a CD-type disc having a lead-in area, a lead-out area and a user area, each having a CD-ROM-type format, comprising:

a differentiator to determine whether the disc is a CD and if it is determined that the disc is a CD, to determine whether the CD is a video CD or an audio CD;

an analyzer to analyze whether a predetermined file system exists on the disc if it is determined by said differentiator that the disc is neither a video CD nor an audio CD;

a first deformatter to deformat a DVD application which has been written to the user area when the predetermined file system exists on the disc, to provide first deformatted data; and a first decoder to decode the first deformatted data to restore an original audio/video signal from the disc.

9. The apparatus of claim 8, further comprising:

a second deformatter to deformat a CD application which has been read from the disc if it is determined by said differentiator that the disc is a video CD or an audio CD, to provide second deformatted data; and a second decoder to decode the second deformatted data to restore the original A/V signal.

10. An apparatus to reproduce information from a physical layer of a CD-type disc having a lead-in area, a lead-out area and a user area, each having a CD-ROM-type format, comprising:

a first differentiator to determine whether the disc is a DVD or a CD by checking the physical structure of the disc;

a second differentiator to determine whether the disc is a video CD or an audio CD if it is determined by said first differentiator that the disc is a CD;

an analyzer to analyze whether a predetermined file system exists on the disc if it is determined by said second differentiator that the disc is neither a video CD nor an audio CD or if it is determined by said first differentiator that the disc is a DVD;

a first deformatter to deformat a DVD application which has been read from the disc if the predetermined file system exists, to provide first deformatted data;

a first decoder to decode the first deformatted data to restore an original A/V signal from the disc;

a second deformatter to deformat a CD application which has been read from the disc if it is determined by said second differentiator that the disc is a video CD or an audio CD, to provide second deformatted data; and a second decoder to decode the second deformatted data to restore original A/V signal from the disc.

11. A method of reproducing data from a physical layer of a CD-type disc which is divided into a lead-in area, a lead-out area and a user area, each having a CD-ROM format, comprising:

(a) determining whether the disc is a CD and if it is determined that the disc is a CD, determining whether the disc is a video CD or an audio CD;

(b) determining whether a predetermined file system exists on the disc if it is determined in said step (a) that the disc is neither a video CD nor an audio CD;

(c) deformatting a DVD application written to the user area when the predetermined file system exists, to provide first deformatted data; and (d) decoding the first deformatted data to restore original A/V signals from the disc.

12. The method according to claim 11, further comprising:

(e) deformatting a CD application which has been read from the disc if it is determined in said step (a) that the disc is a video CD or an audio CD, to provide second deformatted data; and (f) decoding the second deformatted data to restore the original A/V signals.

13. A method of reproducing data from a physical layer of a CD-type disc which is divided into a lead-in area, a lead-out area and a user area, each having a CD-ROM format, comprising:

(a) determining whether the disc is an audio CD by analyzing control information in a subs area of the lead-in area of the disc;

(b) playing an audio CD if it is determined in said step (a) that the disc is an audio CD, and, if it is determined in said step (a) that the disc is not an audio CD, determining whether the disc is a video CD by analyzing top of contents (TOC) information;

(c) analyzing video CD information on a first track of the disc and playing a video CD according to the analyzed video CD information if it is determined in said step (b) that the disc is a video CD and, if it is determined in step (a) that the disc is not a video CD, analyzing a predetermined file system on the disc; and (d) reproducing DVD data if it is determined in said step (c) that the predetermined file system exists.

14. A method of reproducing data from a physical layer of a CD-type disc which is divided into a lead-in area, a lead-out area and a user area, each having a CD-ROM format, comprising:

(a) determining whether the disc has a first format and if it is determined that the disc has the first format, determining whether the disc is a type A disc or a type B disc;

(b) determining whether a predetermined file system exists on the disc if it is determined in said step (a) that the disc is neither a type A disc nor a type B disc;

(c) deformatting an application of a second format written to the user area when the predetermined file system exists, to provide first deformatted data; and (d) decoding the first deformatted data to restore original A/V signals from the disc.

* * * * *

UNITED STATES PATENT AND TRADEMARK OFFICE
CERTIFICATE OF CORRECTION

PATENT NO. : 6,865,340 B1
DATED : March 8, 2005
INVENTOR(S) : Jung-Kwon Heo et al.

It is certified that error appears in the above-identified patent and that said Letters Patent is hereby corrected as shown below:

Column 9,
Line 13, delete ",".

Column 10,
Line 48, change "subs" to -- sub-Q --.

Signed and Sealed this

Second Day of August, 2005

JON W. DUDAS
*Director of the United States Patent and Trademark Office*